United States Patent
Chung et al.

(10) Patent No.: US 11,734,409 B2
(45) Date of Patent: Aug. 22, 2023

(54) DETERMINING ELECTRONIC COMPONENT AUTHENTICITY VIA ELECTRONIC SIGNAL SIGNATURE MEASUREMENT

(71) Applicant: University of South Florida, Tampa, FL (US)

(72) Inventors: Yunghsiao Chung, New Port Richey, FL (US); Feng Yu, Lutz, FL (US); Stephen Edward Saddow, Land O Lakes, FL (US)

(73) Assignee: UNIVERSITY OF SOUTH FLORIDA, Tampa, FL (US)

( * ) Notice: Subject to any disclaimer, the term of this patent is extended or adjusted under 35 U.S.C. 154(b) by 0 days.

(21) Appl. No.: 17/608,838

(22) PCT Filed: Apr. 2, 2021

(86) PCT No.: PCT/US2021/025481
§ 371 (c)(1),
(2) Date: Nov. 4, 2021

(87) PCT Pub. No.: WO2021/211308
PCT Pub. Date: Oct. 21, 2021

(65) Prior Publication Data
US 2023/0038377 A1 Feb. 9, 2023

Related U.S. Application Data

(60) Provisional application No. 63/011,485, filed on Apr. 17, 2020.

(51) Int. Cl.
*G01R 31/00* (2006.01)
*G06F 21/44* (2013.01)
*G01R 31/52* (2020.01)
*G01R 27/16* (2006.01)
*G01R 31/28* (2006.01)

(52) U.S. Cl.
CPC ............ *G06F 21/44* (2013.01); *G01R 27/16* (2013.01); *G01R 31/2851* (2013.01); *G01R 31/52* (2020.01)

(58) Field of Classification Search
USPC ........................... 324/762.01, 762.02
See application file for complete search history.

(56) References Cited

U.S. PATENT DOCUMENTS

| | | |
|---|---|---|
| 2008/0282209 A1 | 11/2008 | Anderson et al. |
| 2010/0070777 A1 | 3/2010 | Salters et al. |
| 2012/0033810 A1 | 2/2012 | Devadas et al. |
| 2013/0176104 A1 | 7/2013 | Rich et al. |

(Continued)

*Primary Examiner* — Vincent Q Nguyen
(74) *Attorney, Agent, or Firm* — Quarles & Brady LLP

(57) ABSTRACT

Examples of determining electronic component authenticity via electronic signal signature measurement are discussed. Reference pin identifiers corresponding to pins of a known authentic electronic component are determined. Measurement values corresponding to characteristics of pins of an electronic component are obtained, and pin identifiers based on the measurement values are generated. Accordingly, an indication that the electronic component is authentic can be provided based at least in part on a comparison of the pin identifiers and the reference pin identifiers.

20 Claims, 10 Drawing Sheets

(56) References Cited

U.S. PATENT DOCUMENTS

2015/0078518 A1* 3/2015 Tziazas .................. G01N 21/84
                                                        378/53
2015/0219714 A1   8/2015 Hamilton et al.
2021/0081574 A1* 3/2021 Chowdhury ......... G06Q 30/018

* cited by examiner

| Pin# | TEST | 1 | 2 | 3 | 4 | 5 | 6 | 7 | 8 |
|---|---|---|---|---|---|---|---|---|---|
| 1 | impedance | | | | | | | | |
|   | diode | | | | | | | | |
| 2 | impedance | | | | | | | | |
|   | diode | | | | | | | | |
| 3 | impedance | | | | | | | | |
|   | diode | | | | | | | | |
| 4 | impedance | | | | | | | | |
|   | diode | | | | | | | | |
| 5 | impedance | | | | | | | | |
|   | diode | | | | | | | | |
| 6 | impedance | | | | | | | | |
|   | diode | | | | | | | | |
| 7 | impedance | | | | | | | | |
|   | diode | | | | | | | | |
| 8 | impedance | | | | | | | | |
|   | diode | | | | | | | | |

FIG. 4A

| Resistance Range | Unit | Code (hex) | Resistance Range | Unit | Code (hex) |
|---|---|---|---|---|---|
| 0 - 50 | Ω | 00 | 1 - 5 | MΩ | 16 |
| 51 - 500 | Ω | 01 | 5 - 10 | MΩ | 17 |
| 501 - 999 | Ω | 02 | 10 - 20 | MΩ | 18 |
| 1 - 5 | KΩ | 03 | 20 - 50 | MΩ | 19 |
| 5 - 10 | KΩ | 04 | 50 - 100 | MΩ | 1A |
| 10 - 20 | KΩ | 05 | Over 100 | MΩ | FF |
| 20 - 50 | KΩ | 06 | Error Code | | |
| 50 - 80 | KΩ | 07 | Leakage Current Over Load | | 1B |
| 80 - 100 | KΩ | 08 | OPEN | | FF |
| 100 - 150 | KΩ | 09 | SHORT | | 00 |
| 150 - 200 | KΩ | 0A | Supply Current Out of Limit | | 1C |
| 200 - 250 | KΩ | 0B | Issue Pin | | 2xPin#xFF |
| 250 - 300 | KΩ | 0C | | | |
| 300 - 350 | KΩ | 0D | | | |
| 350 - 400 | KΩ | 0E | | | |
| 400 - 450 | KΩ | 0F | | | |
| 450 - 500 | KΩ | 10 | | | |
| 500 - 600 | KΩ | 11 | | | |
| 600 - 700 | KΩ | 12 | | | |
| 700 - 800 | KΩ | 13 | | | |
| 800 - 900 | KΩ | 14 | | | |
| 900 - 999 | KΩ | 15 | | | |

FIG. 6

DETERMINING ELECTRONIC COMPONENT AUTHENTICITY VIA ELECTRONIC SIGNAL SIGNATURE MEASUREMENT

CROSS-REFERENCE TO RELATED APPLICATION

This application is a national stage filing under 35 U.S.C. § 371 of International Application No. PCT/US2021/025481, filed Apr. 2, 2021, which claims priority to U.S. provisional application entitled, "DETERMINING ELECTRONIC COMPONENT AUTHENTICITY VIA ELECTRONIC SIGNAL SIGNATURE MEASUREMENT," having Ser. No. 63/011,485, filed Apr. 17, 2020, each of which is incorporated herein by reference.

TECHNICAL FIELD

The present disclosure is generally related to authentication of electronic components.

BACKGROUND

Counterfeit integrated circuit (IC) chips and quality conformance of microelectronics are big challenges. Furthermore, being able to identify counterfeit parts in the supply chain is extremely challenging, time consuming, and expensive. A better way to identify counterfeit parts is needed.

SUMMARY

Embodiments of the present disclosure provide systems and methods for determining authenticity of an integrated circuit chip. One such system comprises at least one measurement component; and at least one computing device in communication with the at least one measurement component. The at least one computing device is configured to perform a plurality of operations that include maintaining, in a data store, reference pin identifiers individually corresponding to characteristics of a pin of a plurality of pins of a known authentic electronic component; obtaining, via the at least one measurement component, a plurality of measurement values corresponding to characteristics of a pin of a plurality of pins of an unknown electronic component that is being tested; generating pin identifiers for the unknown electronic component based at least in part on the plurality of measurement values; and/or providing an indication that the electronic component is authentic based at least in part on a comparison of the pin identifiers and the reference pin identifiers.

The present disclosure can also be viewed as a method for determining authenticity of an integrated circuit chip. One such method comprises maintaining, in a data store via at least one computing device, reference pin identifiers individually corresponding to characteristics of a pin of a plurality of pins of a known authentic electronic component; receiving, via the at least one computing device, a plurality of measurement values corresponding to characteristics of a pin of a plurality of pins of an unknown electronic component that is being tested; generating, via the at least one computing device, pin identifiers for the unknown electronic component based at least in part on the plurality of measurement values; and/or providing, via the at least one computing device, an indication that the electronic component is authentic based at least in part on a comparison of the pin identifiers and the reference pin identifiers.

In one or more aspects for such methods and/or systems, the at least one measurement component comprises a parametric measurement unit (PMU) or a source measurement unit (SMU); the plurality of measurement values comprise pin-to-pin network impedance values individually corresponding to characteristics of the pin of the electronic component; the plurality of measurement values comprise pin-to-pin protected diode current values individually corresponding to characteristics of the pin of the electronic component; the plurality of measurement values comprise a value of an input leakage current from a VCC voltage source to the pin of the electronic component; the plurality of measurement values comprise a value of an input leakage current from the pin of the electronic component to a reference ground; the plurality of measurement values comprise a value of an ICC/IDD supply current of the pin of the electronic component; the electronic component is an integrated circuit chip; the at least one computing device is further configured to maintain a reference component identifier that identifies the known authentic electronic component; the reference component identifier is based at least in part on the reference pin identifiers; the at least one computing device is further configured to generate a component identifier for the electronic component based at least in part on the generated pin identifiers for the electronic component; wherein the comparison of the pin identifiers and the reference pin identifiers comprises a comparison of the generated component identifier and the reference component identifier for the electronic component; and/or wherein the plurality of measurement values are obtained by performing a matrix scan of the plurality of pins.

Other systems, methods, features, and advantages of the present disclosure will be or become apparent to one with skill in the art upon examination of the following drawings and detailed description. It is intended that all such additional systems, methods, features, and advantages be included within this description and be within the scope of the present disclosure.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. Additionally, certain dimensions may be exaggerated to help visually convey certain principles. The drawings illustrate only exemplary embodiments and are therefore not to be considered limiting of the scope described herein, as other equally effective embodiments are within the scope of this disclosure.

FIG. 4A shows an exemplary template for designating pin-to-pin network impedance and diode check values of an 8-pin integrated circuit (IC) according to various embodiments of the present disclosure.

FIG. 6 shows an example of identifier (ID) code characteristics that can be stored in a code data store or library according to various embodiments of the present disclosure.

DETAILED DESCRIPTION

Figure 1:
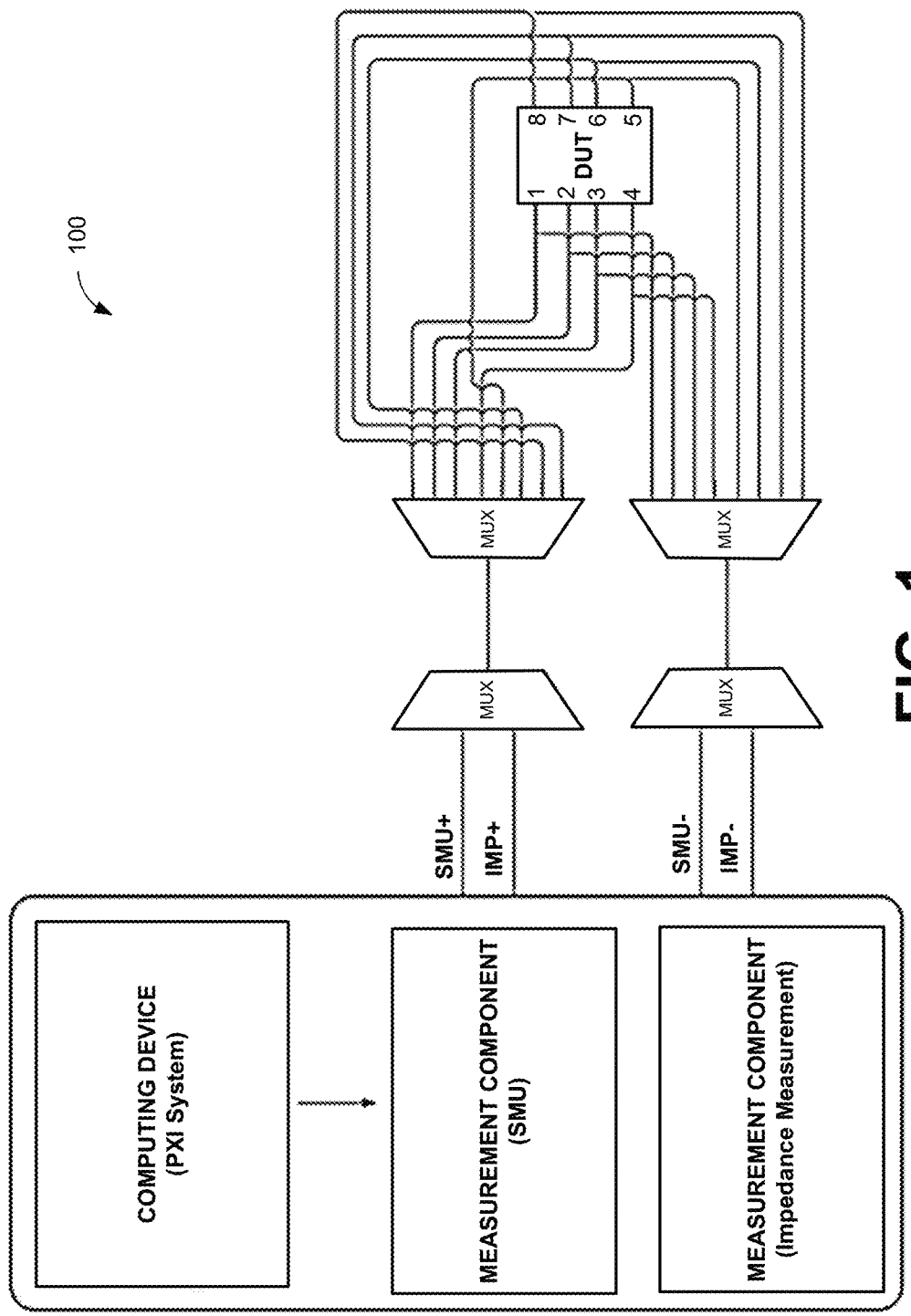
FIG. 1 is a drawing of an exemplary architecture of a system for determining authenticity of an integrated circuit chip according to various embodiments of the present disclosure.

In the following paragraphs, the embodiments are described in further detail by way of example with reference to the attached drawings. In the description, well known components, methods, and/or processing techniques are omitted or briefly described so as not to obscure the embodiments. As used herein, the "present disclosure" refers to any one of the embodiments described herein and any equivalents. Furthermore, reference to various feature(s) of the "present embodiment" is not to suggest that all embodiments must include the referenced feature(s).

Among embodiments, some aspects of the present disclosure are implemented by a computer program executed by one or more processors, as described and illustrated. As would be apparent to one having ordinary skill in the art, one or more embodiments may be implemented, at least in part, by computer-readable instructions in various forms, and the present disclosure is not intended to be limiting to a particular set or sequence of instructions executed by the processor.

The embodiments described herein are not limited in application to the details set forth in the following description or illustrated in the drawings. The disclosed subject matter is capable of other embodiments and of being practiced or carried out in various ways. Also, the phraseology and terminology used herein is for the purpose of description and should not be regarded as limiting. The use of "including," "comprising," or "having" and variations thereof herein is meant to encompass the items listed thereafter, additional items, and equivalents thereof. The terms "connected" and "coupled" are used broadly and encompass both direct and indirect connections and couplings. In addition, the terms "connected" and "coupled" are not limited to electrical, physical, or mechanical connections or couplings. As used herein the terms "machine," "computer," and "server" are not limited to a device with a single processor, but may encompass multiple devices (e.g., computers) linked in a system, devices with multiple processors, special purpose devices, devices with various peripherals and input and output devices, software acting as a computer or server, and combinations of the above.

Systems and methods are discussed herein that include maintaining a reference component identifier and reference pin identifiers for a golden design or a known authentic electronic component. As such, a computing device can cause a measurement component such as a parametric measurement unit (PMU) or a source measurement unit (SMU) to scan an electronic component or device under test (DUT) or an "unknown" electronic component for its physical and structural characteristics. The computing device can obtain measurement values corresponding to characteristics of each pin of the electronic component, generate pin identifiers for pins of the electronic component based on the measurement values, and generate a component identifier for the electronic component based on the generated pin identifiers. Accordingly, the systems and methods disclosed can provide an indication of whether the electronic component is authentic based at least in part on the pin identifiers and the reference pin identifiers.

In various embodiments, an exemplary system and/or method can use matrix scanning (Pins to Pins) to scan the device under test (DUT) for its physical and structural characteristics and convert the scanned data to form a unique identifier (e.g., ID code) for each pin and each device using a code library that contains expected scanned or measurement values and corresponding reference pin identifiers. Such exemplary techniques are more comprehensive and faster than traditional Pin Correlation methods, such as those that use a curve tracer.

Counterfeit electronics is both an extremely serious and a very common issue in the global systems supply chain which increases the risk of critical system errors and failures which can even be life-threatening. Affected systems range from modern mobile devices (cell phones, tablets, etc.), computers & laptops, medical diagnostic & treatment systems, air traffic control & GPS systems, etc. Critical systems typically have a long life cycle (decades) and often use obsolete 'legacy' devices which makes them a target for counterfeit parts due to economic reasons. For example, reproducing legacy parts is both expensive and time consuming due to advances in the manufacturing chain that made these parts obsolete in the first place. In addition, using obsolete parts often leads to quality conformance issues, even if the part is legitimate, since some of the electronics might have been sitting on the shelf for over twenty years.

Purchasing electronic parts directly from part manufacturers and their authorized suppliers can be a low risk step in the procurement of parts for critical systems. However, for various reasons such as an obsolete part, short lead time, etc., parts may be purchased from unauthorized sources or brokers, which can put an entire system that uses the replacement part at risk. For existing systems, some manufacturers often create an ID code in the device memory or microcontroller to prevent counterfeit electronics from being inserted into critical systems. This ID code can be a serial binary code stored in an unerasable or unchangeable register of the device memory. Users must use technical ways such as a JTAG (Joint Test Action Group) interface, Serial Peripheral Interface (SPI), or Inter-Integrated Circuit (I2C) to find this information. Such actions are usually performed by professional engineers and require extra setup and lead time.

Referring now the drawings, FIG. 1 shows an architecture of an exemplary system 100 for determining authenticity of an integrated circuit chip according to various embodiments of the present disclosure. The system 100 includes a computing environment having a computing device, such as a controller and associated technology of a modular electronic instrumentation platform (e.g., a PCI eXtensions for Instrumentation (PXI) PXI/PXIe 2575 system, or PXI/PXIe 4143 system by National Instruments™ of Austin, Tex.). The computing device is in communication with one or more measurement components, such as a parametric measurement unit (PMU) and/or a source measurement unit (SMU).

The measurement components are configured to be electrically connected to an electronic component, which is depicted as the device under test (DUT).

Various applications and/or other functionality may be executed in the computing environment according to various embodiments. Also, various data can be stored in a data store that is accessible to the computing environment. The components executed on the computing environment can be executed to determine electronic component authenticity via electronic signal signature measurement, and can include applications, services, processes, systems, engines, or functionality not discussed in detail herein.

The system 100 disclosed herein provides an easy and convenient tool for performing quality conformance and counterfeit IC detection. In various embodiments, the system 100 can conduct a quick open/short circuit check, leakage current check, and/or supply current check to make sure all the readings are within specification. IC's usually have multiple pins that serve as electrical inputs/outputs and connect to the system through a printed circuit board. As such, the system 100 can use a matrix scan approach to scan from pin to pin of the integrated circuit to get physical characteristics and convert some (or all) of the data to a unique identifier (e.g., ID code) by comparing each device or component to identifiers in a data store (e.g., reference identifiers for a known authentic or "good" device).

In various embodiments, the system 100 can provide an automated test and diagnostic system to rapidly scan between pins thus forming an 'electronic signature' of the electronic component, part, or device under test (DUT). The electronic signature can then be compared to expected signature for a golden design (known authentic device) and fast assessment of the authenticity of an unknown electronic component is thus possible. The example shown in FIG. 1 depicts the system 100 where the DUT is an 8 pin IC.

Using embodiments of the present disclosure, qualified personnel without a strong electronics background can therefore perform quick screen testing, which can save time and expense which is normally needed to set up and develop a testing regimen for microelectronics. The disclosed approach offers several benefits, including: 'signature-based' identification of a part to determine its authenticity and the capability of being utilized by operators who may not have achieved a high skill level as electronics experts. In contrast, conventional electronics assessment can require highly skilled electronics experts, a fact which both increases cost to testing and slows down part assessment.

In one or more aspects, an exemplary system 100 provides advanced pin correlation and integrated circuit identifier (e.g., ID code) generation, in which the system 100 can measure pin physical characteristics of ICs and convert the measured characteristics or data to a unique chips identifier (e.g., ID code) based on reference characteristics and corresponding ID code segments stored in a code data store. As such, an exemplary system 100 can test for many things, including input leakage current from VCC voltage source to Pin & Pin to GND (e.g., a reference ground), Pin to Pin network impedance, Pin to Pin protected diode current, and/or short circuit (ICC)/supply current (IDD), among others.

Non-limiting examples for identifier (e.g., ID code) configuration are provided in Table 1 below. For example, the values shown in the first row correspond to ID codes for measurements of an electronic component that are obtained for the parameters provided in the second row of the table. The individual ID codes may then be compared against reference ID codes for the electronic component that are stored in a code data store or library in order to authenticate the electronic component. Additionally, certain ones of the ID codes may be combined in a particular sequence to form a digital signature for the electronic component that can also be compared against a reference digital signature for the electronic component that is also stored in the code data store/library in order to authenticate the electronic component.

TABLE 1

| FF | 00 | AA | 55 | XXXX |
|---|---|---|---|---|
| Open/Short | Leakage Current (high) | Leakage Current (low) | Supply Current | Network Impedance |

Figure 2:
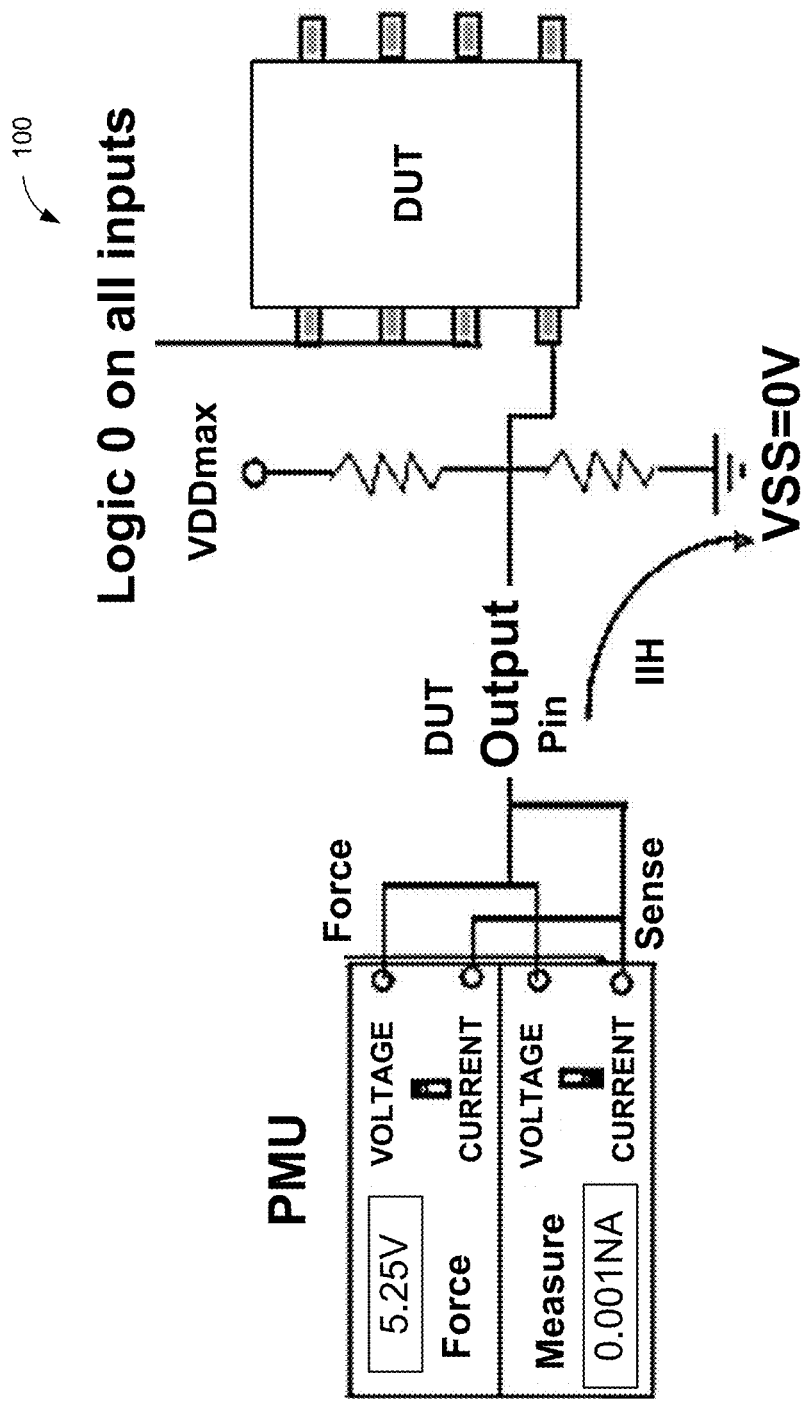
FIG. 2 shows an exemplary system for determining an input leakage current (high) (IIH) according to various embodiments of the present disclosure.

Next, FIG. 2 shows an exemplary system for determining an input leakage current (high) (IIH) according to various embodiments of the present disclosure. Accordingly, IIH testing provided by the system 100 involves measuring the current into an input terminal when a specified high-level voltage is applied to that input, in certain embodiments. The testing criteria can be related to the manufacturer's specification and can be used to make sure that the electronic component and/or testing equipment are operating at an acceptable level before proceeding with additional testing. A non-limiting example for testing criteria is provided below in Table 2:

TABLE 2

| Item | Symbol | Max. | Unit |
|---|---|---|---|
| Input Current | IIH | 40 | µA |
| | IIL | −0.8 | µA |
| | II | 0.2 | µA |

After subsequent testing and measurements of the characteristics of the electronic component, such as the measurement of IIH current on a particular pin of a 2×Pin electronic component, an ID code can be designated for the particular pin of the electronic component based on the IIH testing and can be populated within the code data store/library. An example is provided below in Table 3, where a measured value that compares positively with a reference value for the electronic component is provided a passing (Pass) ID code and a measured value that compares negatively with a reference value for the electronic component is assigned a failing (Fail) ID code. Accordingly, a digital signature can be generated that includes the ID code for pins of the electronic component, in which the generated digital signature of a counterfeit version of the electronic component may have a "Fail Code" as part of its digital signature which will not match a reference digital signature of an authentic version of the electronic component that contains the "Pass Code" as part of its digital signature.

TABLE 3

| | Data Size | Code |
|---|---|---|
| Pass Code | 2xPin # | 2xPin#x00 |
| Fail Code | 2xPin # | 2xPin#xFF |

Figure 3:
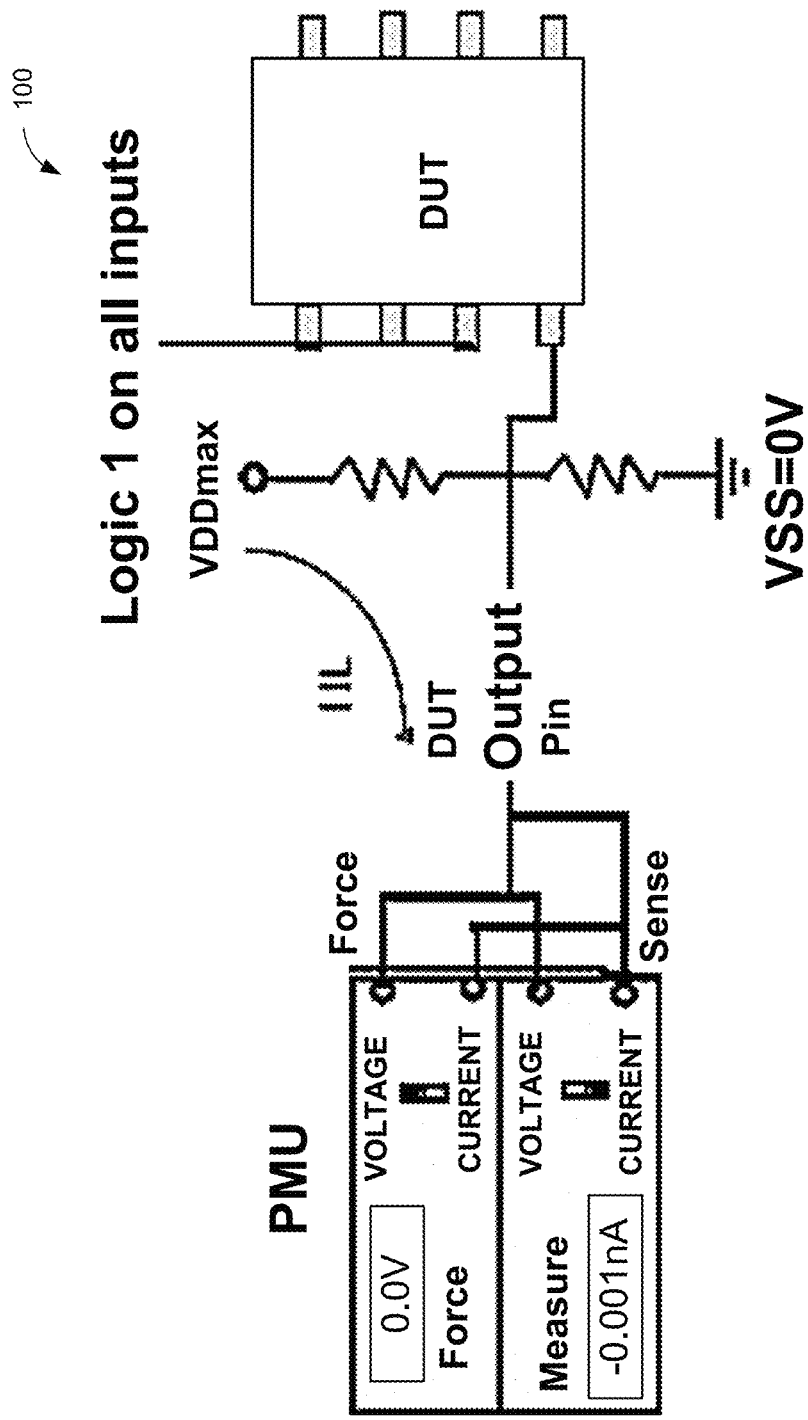
FIG. 3 shows an exemplary system for determining an input leakage current (low) (IIL) according to various embodiments of the present disclosure.

Correspondingly, FIG. 3 shows an exemplary system for determining an input leakage current (low) (IIL) according to various embodiments of the present disclosure. IIL testing provided by the system 100 involves measuring the current into an input terminal when a specified low-level voltage is applied to that input. The testing criteria can be related to the manufacturer's specification. A non-limiting example for testing criteria is provided above in Table 2. Accordingly, after subsequent testing and measurements of the characteristics of the electronic component, such as the measurement of $I_{IL}$ current on a particular pin of a 2×Pin electronic component, an ID code can be designated for the particular pin of the circuit code component based on the IIL testing and can be populated within the code data store/library. An example is provided in Table 3 above, where a measured value that compares positively with a reference value for the electronic component is provided a passing (Pass) ID code and a measured value that compares negatively with a reference value for the electronic component is assigned a failing (Fail) ID code.

Figure 4B:
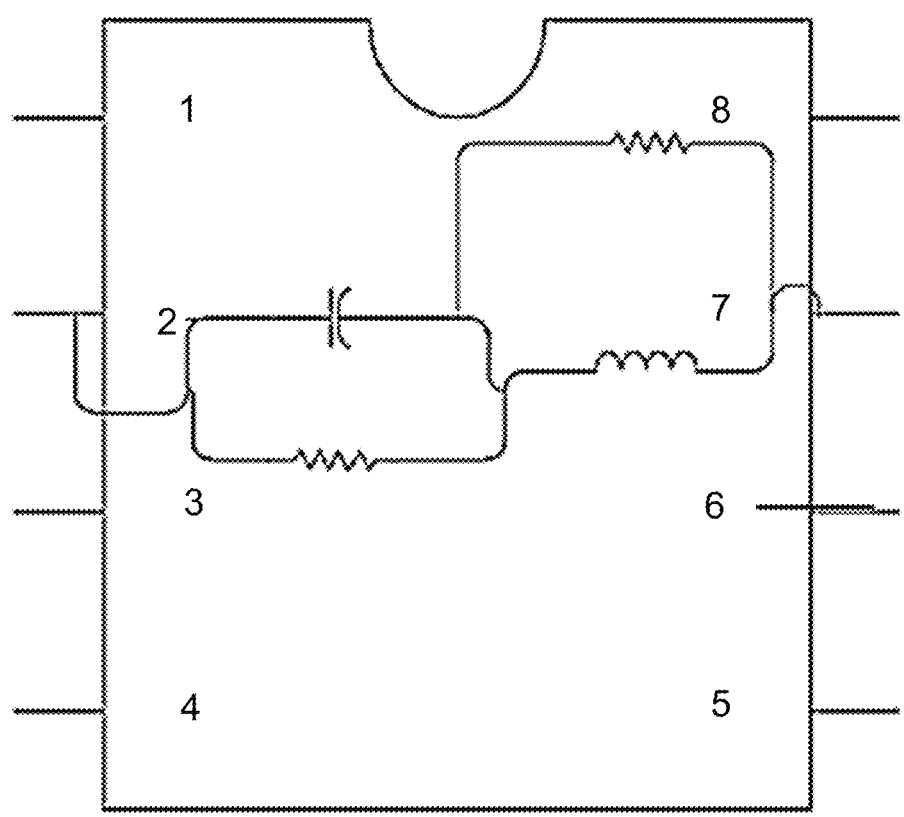
FIG. 4B shows an example of an equivalent circuit for an 8-pin IC.

Referring now to FIG. 4A, the figure shows an exemplary template for designating pin-to-pin network impedance and diode check values of an 8-pin integrated circuit (IC) according to various embodiments of the present disclosure. In various embodiments, the pin-to-pin values can include pin-to-pin network impedance values and pin-to-pin protected diode current values individually corresponding to characteristics of a pin of an electronic component or DUT.

Regarding impedance testing, the system 100 can be configured to determine impedance for an electronic component. Impedance (electrical impedance) is a collective term for the AC (alternating current) resistance from resistors, inductors, and capacitors in a circuit. Given that impedance is a complex number, the real part is called resistance (R) and the imaginary part is called reactance (X) as represented in the equations below:

$$Z = R + jX$$
$$X_C = -\frac{1}{\omega C} = -\frac{1}{2\pi fC}$$
$$X_L = \omega L = 2\pi fL,$$

where $X_C$ represents the capacitance resistance and $X_L$ represents the inductive reactance.

In IC chips, one can consider the internal structure which comprises a series combination of resistors, capacitors, and impedance. The equivalent impedance $Z_{eq}$ can be calculated in terms of the equivalent series resistance $R_{eq}$ and reactance $X_{eq}$. An example of an equivalent circuit for an 8-pin IC is reproduced in FIG. 4B.

$$Z_{eq} = R_{eq} + jX_{eq}$$
$$R_{eq} = \frac{(X_1R_2 + X_2R_1)(X_1 + X_2) + (R_1R_2 - X_1X_2)(R_1 + R_2)}{(R_1 + R_2)^2 + (X_1 + X_2)^2}$$
$$X_{eq} = \frac{(X_1R_2 + X_2R_1)(R_1 + R_2) - (R_1R_2 - X_1X_2)(X_1 + X_2)}{(R_1 + R_2)^2 + (X_1 + X_2)^2}$$

One can, for example, measure the impedance with the following conditions: a 100 kHz test frequency and a 100 mV test level while reading the impedance from Pin to Pin. The disclosed approach can convert the impendence to an identifier (e.g., ID code) via a code library in accordance with embodiments of the present disclosure.

Figure 5:
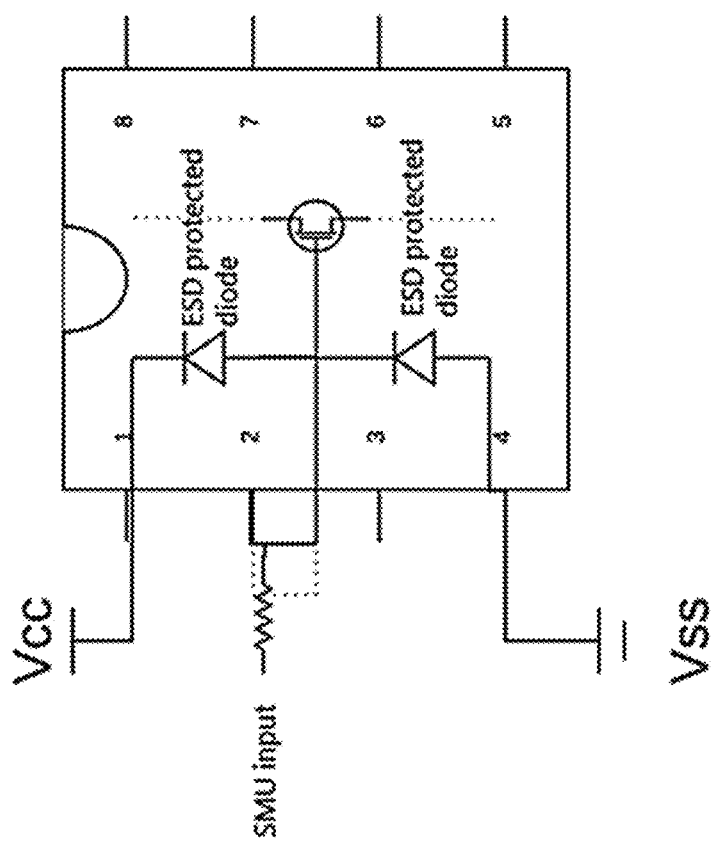
FIG. 5 illustrates the testing of an exemplary ESD (Electrostatic Discharge) protected diode of an 8-pin IC in accordance with various embodiments of the present disclosure.

Next, FIG. 5 illustrates the testing of an exemplary ESD (Electrostatic Discharge) protected diode of an 8-pin IC in accordance with various embodiments of the present disclosure. Protection diodes are often present on IC inputs as shown on the schematic of FIG. 5. The diodes of FIG. 5 are part of the ESD protection scheme. The system 100 of FIG. 1 can perform a network scan, verify the existence of ESD protection (e.g., by using an SMU), and calculate the forward current at 1.0 V. The system 100 can then convert the calculated forward current to an ID code via the code data store/library.

FIG. 6 shows an example of identifier (ID) code characteristics that can be stored in a code data store or library according to various embodiments of the present disclosure. The example provided in FIG. 6 shows a resistance range, unit, and corresponding value or code, which can be a hexadecimal value comprising x00 to xFF. An error code is also provided that can include various characteristics, including "leakage current overload," "OPEN," "SHORT," "supply current out of limit," or "issue pin," and a corresponding hexadecimal value.

Figure 7:
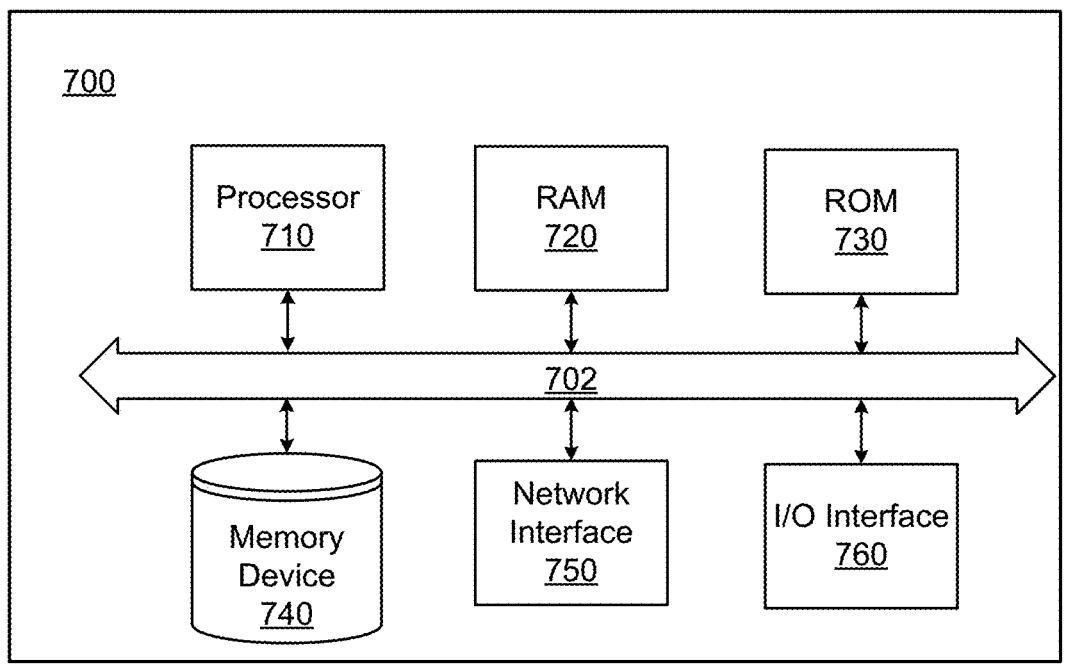
FIG. 7 is a schematic block diagram that illustrates an exemplary computing device employed in the various embodiments of the present disclosure.

In FIG. 7, a schematic block diagram of an exemplary computing device 700 is illustrated that can be employed in the various embodiments of the present disclosure. Any of the functionalities discussed herein may be implemented, in part, using one or more elements of the computing device 700. The computing device 700 can include one or more of a processor 710, a Random Access Memory ("RAM") 720, a Read Only Memory ("ROM") 730, a memory device 740, a network interface 750, and an Input Output ("I/O") interface 760. The elements of the computing device 700 are communicatively coupled via a bus 702.

The processor 710 can include an arithmetic processor, Application Specific Integrated Circuit ("ASIC"), or other types of hardware or software processors. The RAM and ROM 720 and 730 can include a memory that stores computer-readable instructions to be executed by the processor 710. The memory device 730 stores computer-readable instructions thereon that, when executed by the processor 710, direct the processor 710 to execute various aspects of the present disclosure described herein. When the processor 710 includes an ASIC, the processes described herein may be executed by the ASIC according to an embedded circuitry design of the ASIC, by firmware of the ASIC, or both an embedded circuitry design and firmware of the ASIC. As a non-limiting example group, the memory device 730 comprises one or more of an optical disc, a magnetic disc, a semiconductor memory (i.e., a semiconductor, floating gate, or similar flash based memory), a magnetic tape memory, a removable memory, combinations thereof, or any other known memory means for storing computer-readable instructions. The network interface 750 can include hardware interfaces to communicate over data networks. The I/O interface 760 can include device input and output interfaces, such as keyboard, pointing device, display, communication, and other interfaces. The bus 702 can electrically and communicatively couple the processor 710, the RAM 720, the ROM 730, the memory device 740, the network interface 750, and the I/O interface 760, so that data and instructions may be communicated among them. The computing device 700 may be linked or coupled to other devices, including, but not limited to, special purpose devices, devices with various peripherals and input and output devices (such as measurement components), tester circuitry, etc.

In operation, the processor 710 is configured to retrieve computer-readable instructions stored on the memory device 740, the RAM 720, the ROM 730, or another storage means, and copy the computer-readable instructions to the RAM 720 or the ROM 730 for execution, for example. The processor 710 is further configured to execute the computer-readable instructions to implement various aspects and features of the present disclosure. For example, the processor 710 may be adapted and configured to execute the processes described above. Also, the memory device 730 can store any library, data store, database, application, software, or code, including as described above.

Figure 8:
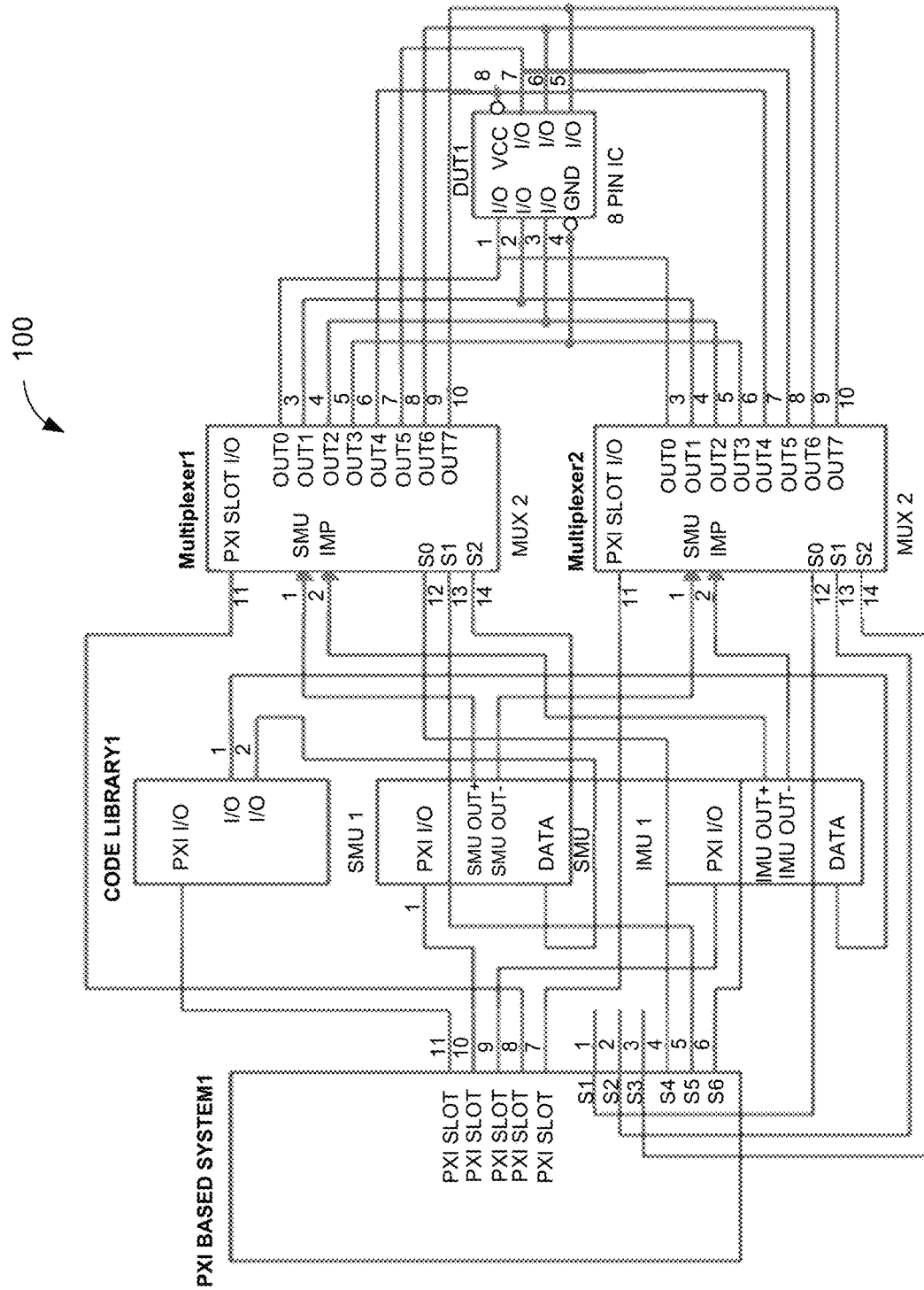
FIG. 8 shows a circuit diagram depicting portions of an exemplary system for determining authenticity of an integrated circuit chip according to various embodiments of the present disclosure.

Additionally, FIG. 8 shows a circuit diagram depicting portions of an exemplary system for determining authenticity of an integrated circuit chip according to various embodiments of the present disclosure. As depicted, the system 100 can include a computing environment having the computing device depicted as a PXI-based system. The computing environment includes a code data store or code library, one or more measurement components, a first multiplexer (MUX1), and a second multiplexer (MUX2) that are in communication with the computing device. The measurement components of FIG. 8 include, but are not limited to, a source measurement unit (SMU1) and an impedance measurement unit (IMU1) configured to be electrically connected to the device under test (DUT1).

Figure 9:
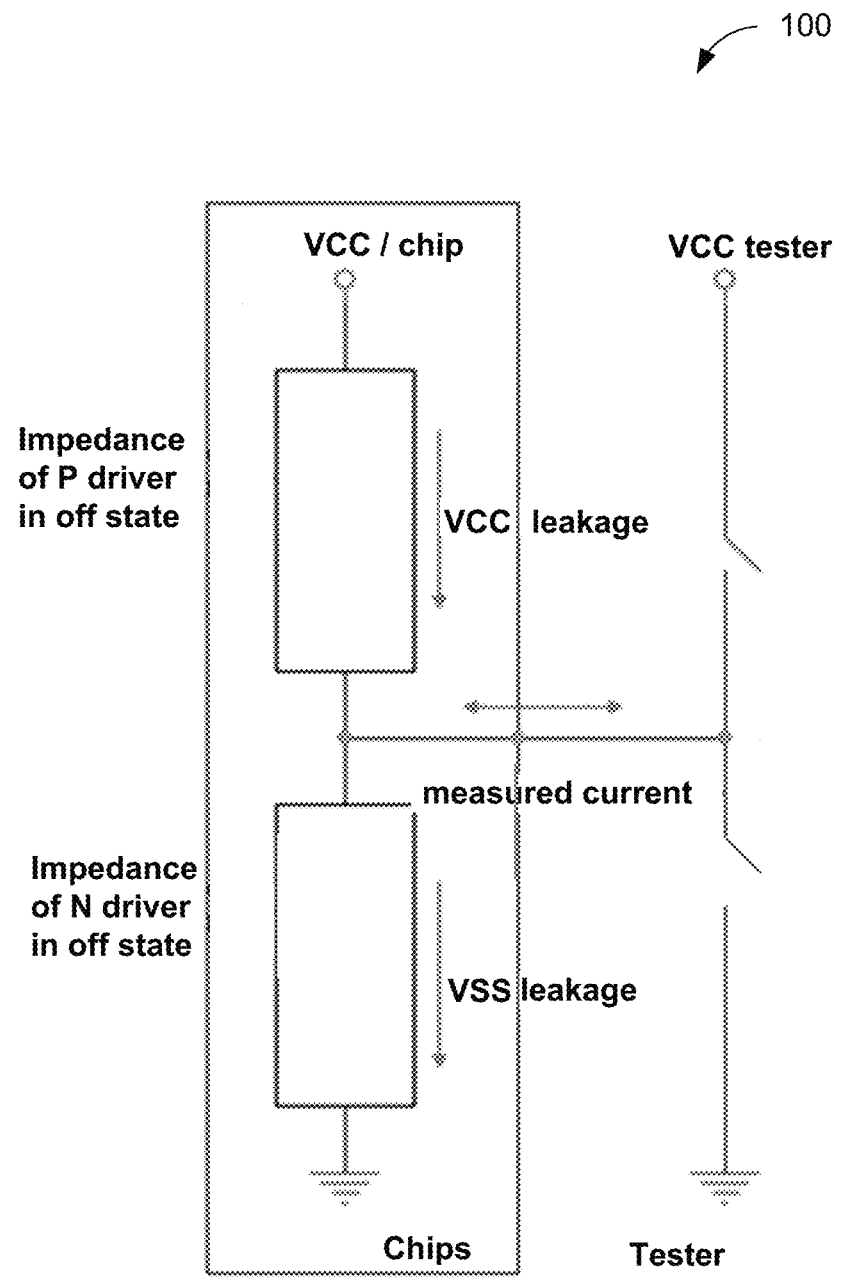
FIG. 9 is a circuit diagram depicting portions of an exemplary system for determining an input leakage current according to various embodiments of the present disclosure.

FIG. 9 is a circuit diagram depicting portions of an exemplary system for determining an input leakage current according to various embodiments of the present disclosure. As depicted, the system 100 can include a tester circuit that facilitates determining input leakage current (high) or input leakage current (low) of an electronic component or device under test (Chips).

Any of the functionality or circuits described herein may take the form of, or incorporate, or be incorporated into, a register, an advanced memory buffer (AMB), a buffer, or the like, and may comply with Joint Electron Device Engineering Council (JEDEC) standards, and may have forwarding, storing, and/or buffering capabilities.

A phrase, such as "at least one of X, Y, or Z," unless specifically stated otherwise, is to be understood with the context as used in general to present that an item, term, etc., can be either X, Y, or Z, or any combination thereof (e.g., X, Y, and/or Z). Similarly, "at least one of X, Y, and Z," unless specifically stated otherwise, is to be understood to present that an item, term, etc., can be either X, Y, and Z, or any combination thereof (e.g., X, Y, and/or Z). Thus, as used herein, such phrases are not generally intended to, and should not, imply that certain embodiments require at least one of either X, Y, or Z to be present, but not, for example, one X and one Y. Further, such phrases should not imply that certain embodiments require each of at least one of X, at least one of Y, and at least one of Z to be present.

Although embodiments have been described herein in detail, the descriptions are by way of example. The features of the embodiments described herein are representative and, in alternative embodiments, certain features and elements may be added or omitted. Additionally, modifications to aspects of the embodiments described herein may be made by those skilled in the art without departing from the scope of the present disclosure defined in the following claims, the scope of which are to be accorded the broadest interpretation so as to encompass modifications and equivalent structures.

Therefore, at least the following is claimed:

1. A system, comprising:
   at least one measurement component; and
   at least one computing device in communication with the at least one measurement component, the at least one computing device being configured to perform a plurality of operations, the plurality of operations comprising:
   maintaining, in a data store, reference pin identifiers individually corresponding to characteristics of a pin of a plurality of pins of a known authentic electronic component;
   obtaining, via the at least one measurement component, a plurality of measurement values corresponding to characteristics of a pin of a plurality of pins of an unknown electronic component that is being tested, the plurality of measurement values comprising at least one value representing a pin-to-pin electrical measurement;
   generating pin identifiers for the unknown electronic component based at least in part on the plurality of measurement values; and
   providing an indication that the electronic component is authentic based at least in part on a comparison of the pin identifiers and the reference pin identifiers.

2. The system of claim 1, wherein the at least one measurement component comprises a parametric measurement unit (PMU) or a source measurement unit (SMU).

3. The system of claim 1, wherein the at least one value representing a pin-to-pin electrical measurement comprises pin-to-pin network impedance values individually corresponding to the characteristics of the pin of the electronic component.

4. The system of claim 1, wherein the plurality of measurement values comprise a value of an input leakage current from a VCC voltage source to the pin of the electronic component, a value of an input leakage current from the pin of the electronic component to a reference ground; and a value of an ICC/IDD supply current of the pin of the electronic component.

5. The system of claim 1, wherein the electronic component is an integrated circuit chip.

6. The system of claim 1, wherein the at least one computing device is further configured to maintain a reference component identifier that identifies the known authentic electronic component.

7. The system of claim 6, wherein the reference component identifier is based at least in part on the reference pin identifiers.

8. The system of claim 7, wherein the at least one computing device is further configured to generate a component identifier for the electronic component based at least in part on the generated pin identifiers for the electronic component, wherein the comparison of the pin identifiers and the reference pin identifiers comprises a comparison of the generated component identifier and the reference component identifier for the electronic component.

9. A system, comprising:
   at least one measurement component; and
   at least one computing device in communication with the at least one measurement component, the at least one computing device being configured to perform a plurality of operations, the plurality of operations comprising:
   maintaining, in a data store, reference pin identifiers individually corresponding to characteristics of a pin of a plurality of pins of a known authentic electronic component;
   obtaining, via the at least one measurement component, a plurality of measurement values corresponding to characteristics of a pin of a plurality of pins of an unknown electronic component that is being tested;
   generating pin identifiers for the unknown electronic component based at least in part on the plurality of measurement values; and providing an indication that the electronic component is authentic based at least in part on a comparison of the pin identifiers and the reference pin identifiers, wherein the plurality of measurement values comprises pin-to-pin protected diode current values individually corresponding to characteristics of the pin of the electronic component.

10. The system of claim 9, wherein the plurality of measurement values further comprise a value of an input leakage current from a VCC voltage source to the pin of the electronic component, a value of an input leakage current from the pin of the electronic component to a reference ground; and a value of an ICC/IDD supply current of the pin of the electronic component.

11. A method, comprising:
maintaining, in a data store via at least one computing device, reference pin identifiers individually corresponding to characteristics of a pin of a plurality of pins of a known authentic electronic component;

receiving, via the at least one computing device, a plurality of measurement values corresponding to characteristics of a pin of a plurality of pins of an unknown electronic component that is being tested, the plurality of measurement values comprising at least one value representing a pin-to-pin electrical measurement;

generating, via the at least one computing device, pin identifiers for the unknown electronic component based at least in part on the plurality of measurement values; and providing, via the at least one computing device, an indication that the electronic component is authentic based at least in part on a comparison of the pin identifiers and the reference pin identifiers.

12. The method of claim 11, wherein the at least one value representing a pin-to-pin electrical measurement comprises pin-to-pin network impedance values individually corresponding to the characteristics of the pin of the electronic component.

13. The method of claim 11, wherein the at least one value representing a pin-to-pin electrical measurement comprises pin-to-pin protected diode current values individually corresponding to the characteristics of the pin of the electronic component.

14. The method of claim 13, wherein the plurality of measurement values further comprise a value of an input leakage current from a VCC voltage source to the pin of the electronic component, a value of an input leakage current from the pin of the electronic component to a reference ground; and a value of an ICC/IDD supply current of the pin of the electronic component.

15. The method of claim 11, wherein the plurality of measurement values comprise a value of an input leakage current from a VCC voltage source to the pin of the electronic component, a value of an input leakage current from the pin of the electronic component to a reference ground; and a value of an ICC/IDD supply current of the pin of the electronic component.

16. The method of claim 11, wherein the electronic component is an integrated circuit chip.

17. The method of claim 11, further comprising maintaining, in the data store via the at least one computing device, a reference component identifier that identifies the known authentic electronic component.

18. The method of claim 17, wherein the reference component identifier is based at least in part on the reference pin identifiers.

19. The method of claim 18, wherein the at least one computing device is further configured to generate a component identifier for the electronic component based at least in part on the generated pin identifiers for the electronic component, wherein the comparison of the pin identifiers and the reference pin identifiers comprises a comparison of the generated component identifier and the reference component identifier for the electronic component.

20. The method of claim 11, wherein the plurality of measurement values is obtained by performing a matrix scan of the plurality of pins.

* * * * *